(12) United States Patent
Pronello

(10) Patent No.: US 9,493,134 B2
(45) Date of Patent: Nov. 15, 2016

(54) MOTOR VEHICLE ROLLOVER PROTECTION DEVICE AND METHOD

(71) Applicant: Heriberto Antonio Pronello, Ciudad Autonoma de Buenos Aires (AR)

(72) Inventor: Heriberto Antonio Pronello, Ciudad Autonoma de Buenos Aires (AR)

(*) Notice: Subject to any disclaimer, the term of this patent is extended or adjusted under 35 U.S.C. 154(b) by 0 days.

(21) Appl. No.: 14/642,524

(22) Filed: Mar. 9, 2015

(65) Prior Publication Data

US 2015/0251622 A1 Sep. 10, 2015

(30) Foreign Application Priority Data

Mar. 10, 2014 (AR) .............................. 20140100812

(51) Int. Cl.
*B60N 99/00* (2006.01)
*B60R 21/13* (2006.01)
*F16B 5/04* (2006.01)

(52) U.S. Cl.
CPC .......... *B60R 21/13* (2013.01); *B60R 2021/137* (2013.01); *F16B 5/04* (2013.01); *Y10T 29/49618* (2015.01)

(58) Field of Classification Search
CPC ............ B60R 21/13; B60R 2021/137; Y10T 29/49618; F16B 5/04
See application file for complete search history.

(56) References Cited

U.S. PATENT DOCUMENTS

| 3,622,177 A | 11/1971 | Notestine et al. |
| 4,900,058 A | 2/1990 | Hobrecht |
| 7,338,112 B2 | 3/2008 | Gilliland et al. |
| 7,717,492 B2 | 5/2010 | Friedman et al. |

OTHER PUBLICATIONS

Brambati, et al. "*Inner cages and external anti-rollover beams for pickups*" ("*Jaulas internas y barras externas antivuelco para camionetas pick-up*")—Center for Experimentation of Road Safety (Centro Experimental de Sequridad Vial—CESVI), Jun. 2011, Argentina, pp. 66-82.

*Primary Examiner* — Lori L Lyjak
(74) *Attorney, Agent, or Firm* — Muncy, Geissler, Olds & Lowe, P.C.

(57) ABSTRACT

A rollover protection device and method for use in work vehicles of the pickup and light truck types, in which a linking structure is applied to the roof of the vehicle cabin, the structure linking all the pillars of the original vehicle roof, thereby forming with the roof and the pillars an integral resistant structure for containing and regulating the deformation of the roof and the pillars upon a rollover event.

22 Claims, 15 Drawing Sheets

MOTOR VEHICLE ROLLOVER PROTECTION DEVICE AND METHOD

FIELD OF THE INVENTION

The invention refers to a device for the protection of vehicle cabins, and more specifically for cabins of vehicles of the light truck and pickup types, which can be installed in said vehicles with the purpose of reducing the damage to the cabin, and therefore the potential injury to the occupants within the vehicle, that may occur during a rollover event.

BACKGROUND OF THE INVENTION

Work vehicles known as pickups or light trucks are designed to behave according to existing security guidelines or regulations in the event of frontal or side impacts or collisions. However, regarding rollovers, there are no standard guidelines to evaluate the vehicle behavior, nor any minimum parameters for said vehicles to achieve.

In recent vehicle models, it is noticeable that manufactures have increased the strength of pickup cabins, in order to prevent buckling or collapse of the cabin during rollovers.

In this sense, in order to test the strength of the structure, the Insurance Institute for Highway Safety (IIHS) carries out a test in which the vehicle is placed under a press and subjected to pressure from a pressing plate above the intersection between the A pillar and the roof, as well as the surrounding area, the pressure being capable of producing a 5-inch deformation of the cabin.

In order to compare test results obtained with different vehicles, the IIHS has developed a coefficient which is obtained by dividing the load required to obtain a 5-inch deformation by the weight of the vehicle. Therefore, if a pickup weighting 2000 kg required 8000 kg of force in order to reach a 5-inch deformation, the coefficient for this vehicle is 8000kg/2000kg=4.

Usually, coefficients are in the range from 3 to 4. A value of 4 is needed to reach a "Good" rating, according to IIHS test, while a coefficient of 4.75 is the highest coefficient obtained in pickup cabin tests.

In other words, for a 2000 kg pickup, a typical weight for various pickup models, the load needed to produce a 5-inch deformation varies from 6 to 8 tons up to 9.5 tons for the highest coefficient of 4.75.

Even so, in some activities with a high rollover occurrence due to the type of roads and terrains involved and lack of proper driver training, such as mining and oil well activities, in which severe cabin crushing or buckling can occur, it is a common practice to reinforce the cabin of pickups with the purpose of reducing the risk of injury to the occupants in the event of a rollover.

Different kinds of rollover protection devices for pickups are known, which can be classified as internal and external protections.

Internal Protection Devices:

Internal protections, also known as "Cages" or "Roll Cages, are frames or structures installed within the cabin, constructed from beams or tubes and usually assembled inside the passenger space with bolts or other fastening means.

These types of protection devices have several drawbacks, such as, for example:

1) The protection structure itself presents a hazard to the occupants of the vehicle in the event of a collision or other accidents, because the cage comprises solid elements located within the passenger area, which will often hurt the occupants;

2) These protection devices interfere with the vehicle compartments in the event of frontal or side collisions, as it alters the load/deformation conditions of the original vehicle. This can result in an undesirable deceleration increase of the vehicle occupants;

3) They limit the habitability, that is to say the space and comfort of the cabin;

4) The protection installation is cumbersome, especially on recent pickup models as it comprises more voluminous dashboards and upholstery.

There are some known variations of said protections, which involve designing the cage or safety structure to be located underneath the original upholstery, with minor modifications.

However, this type of solutions requires:

a) A high construction cost due to the precision required in shaping the tubes, machined assemblies, etc.;

b) A significant degree of disassembly of the dashboard and upholstery;

c) Long installation time per unit;

d) High cost, incompatible for uses not requiring such a level of aesthetic and functional details.

In conclusion, this alternative only solves one aspect of the disadvantages of internal cages; since the cage is underneath the upholstery no longer presents a danger to the occupants, yet the other disadvantages still remain.

Moreover, in order for the internal protection system to be effective, it should deform at the same time and in similar dimensions as the deformations occurring on the vehicle cabin, which may be termed as "joint deformation". This joint deformation combines the resistance to deformation provided by the reinforcement system with the strength of the original cabin, both deforming simultaneously. During joint deformation, the protection system needs only to provide enough resistance to the cabin to allow an acceptable deformation amplitude, such as 5 inches according to IIHS. Achieving this joint deformation is highly important, as this deformation reduces the deceleration affecting the driver and passengers during a rollover event.

Precisely, in order to mitigate the deceleration, said test protocols establish maximum tolerated deformation amplitudes, always giving priority attention to the reduction of the internal physical space that must be inhabited by the occupants.

Cages and safety structures allow, among their characteristics, to comply with the condition of "joint deformation" together with the cabin. This behavior is the result of proper design complemented by virtual and practical tests directed at the evaluation and adjustment of this feature.

External Protection Devices

There are two types of external protection devices:

U.S. Pat. No. 3,622,177 by Notestine, granted on Nov., 1971, and U.S. Pat. No. 4,900,058 by Hobrecht, granted on February, 1990, describe protection designs as accessory equipment for units exposed to rollover conditions, such as four-wheel drive vehicles, vans, sports, etc. Furthermore, U.S. Pat. No. 7,338,112 by Gilliland, granted on March, 2008, describes a tube structure placed outside the vehicle.

These types of structures, in addition to not being aesthetically pleasing, expand and extend the vehicle profile. They add dimensions and protrusions that are unsuitable for transit in places where they might get stuck, also affecting the aerodynamic features of the vehicle and consequently increasing fuel consumption and noise generation, which causes discomfort to the occupants of the vehicle during long trips.

As a result of these characteristics, these structures located on the exterior of the vehicle are usually excluded from call for tenders for vehicle equipment carried out by users of a large number of pickups.

Another exterior cabin protection device of said type is known in the art as "Black Swan", developed by Delta-V Experts SA, which consists of a structure that is fixed to the truck bed and projects as a cantilever beam over the cabin roof. Said solution is reasonable for application in single cabin vehicles, since the extent of the cantilever is approximately the same as the length of the cabin.

However, since this protection utilizes a cantilever beam, its front end is exposed to a moment of twice the magnitude, i.e. force*length vs. force*length/2, in relation with other protection devices where all ends are supported, e.g. by being applied transversely from side to side of the roof. Therefore, in order to obtain a similar protection with this alternative, a significant increase in materials is required, and in addition to the inherent cost, the truck is subjected to a permanent extra weight.

Given the above, the use of this option on double cabin pickups would lead to a cantilever which is twice as long as the ones needed for single cabin pickups, and the resulting moment at the front end would be four times that of protection devices that are supported from side to side on the cabin, i.e. 2×force×length vs. force×length/2. Therefore, such protection device would require the structure to withstand four times more stress in order to provide the cabin with the same protection as transversally fixed reinforcements. The greater added weight to the vehicle due to the structure and the space occupied on the bed by this type of designs discourage their use on double cabin vehicles.

In order to reduce the length of the cantilever, some variations adopt a higher position on the front end. With this increased height, the structure protects the cabin due to a line formed between the front end of the cantilever and the nose of the vehicle, sheltering the vulnerable areas of the roof without the need for a longer cantilever.

However, such a large projection is susceptible to getting stuck on the terrain when moving lengthwise, before or during the rollover event. In these cases the deceleration is significant and compromises the survival of the occupants.

Another external protection system is the HALO SYSTEM, developed by Safety Engineering International (SEI).

U.S. Pat. No. 7,717,492 by Safety Engineering International (SEI), granted in May, 2010, describes a device intended to improve the behavior of vehicles during a rollover event. Said device is based on the mechanics of rollover in which the truck is expected to roll around its center mass axis, said axis being transversally oriented to the direction of the successive rolls (barrel rolls).

According to this concept, it is considered that when rolling over with the roof upon the ground there is a radius between the center mass axis of the vehicle and the ground. However when the vehicle continues rolling, it will touch the ground with one of the corners of the roof, and since said radius at that point is greater, the truck will experience an upward vertical acceleration, or in cases where the structure formed by the pillar and the roof buckles, the roof will collapse.

In order to eliminate said vertical acceleration, the HALO system proposes placing exterior arcs over the roof in order to allow the vehicle to roll without experiencing said supposed vertical accelerations, as shown in FIG. 1 herein.

However, the HALO system does not take into account that, due to rollover mechanics, when the wheels come into contact with the ground they will also produce an upward vertical acceleration of the vehicle, i.e. bouncing. The vehicle will rise and then fall, impact on the ground and continue rolling. It's during this impact that the roof and consequently, the pillars supporting it, suffer the greatest deformation stress, and the HALO system is not properly designed to absorb this stress in an appropriate manner.

BRIEF DESCRIPTION OF THE INVENTION

It is an object of the present invention to provide a rollover protection device for vehicles, and more specifically for work vehicles of the pickup and light truck type, wherein the device comprises a linking structure, applied to the roof of the cabin of the vehicle, that links all pillars of the original vehicle roof, forming thereby said linking structure, the roof and the pillars an integral resistant structure for containing and regulating the deformation of the roof and its pillars upon a rollover event.

In a preferred embodiment of the present invention, for vehicles of double cabin pickup type, the linking structure is connected to all six pillars supporting the roof by their topmost end in order to jointly contain and regulate the deformation during a rollover event.

In a preferred embodiment of the present invention, for vehicles of the single cabin pickup types, the linking structure is connected to all four pillars supporting the roof by their topmost end in order to jointly contain and regulate the deformation during a rollover event In a preferred embodiment of the present invention, said linking structure comprises a plate applied to the roof and connected to all pillars thereof In a preferred embodiment of the present invention, the plate is secured to the roof by means of bolts, rivets, adhesives or a combination thereof.

In a more preferred embodiment of the present invention, said plate comprises a laminate of composite material applied to the roof.

In a preferred embodiment of the present invention, the composite material comprises carbon fiber, Kevlar® or glass fiber and epoxy, phenolic or polyester resins.

In a more preferred embodiment of the present invention, said composite material laminate further comprises at least one honeycomb spacer and another laminate over each spacer, thus forming a "sandwich" type plate with a high moment of inertia In a most preferred embodiment of the present invention, said linking structure comprises a truss structure, comprising a plurality of beams of the truss type, the beams being arranged so that upon the deformation of one of the pillars of the vehicle the linking structure distributes the resulting load among the remaining pillars.

In a preferred embodiment of the present invention, said beams of the truss type are comprised of a plurality of cantilevers attached to a central body or structure.

In a preferred embodiment of the present invention, said linking structure further comprises controllable and calibratable deformation elements.

It is also an object of the present invention to provide a method for reinforcing and protecting a vehicle against rollover, particularly work vehicles of the pickup and light truck types, by containing the deformation of the roof and its pillars, wherein the method comprises linking all pillars of the roof of the cabin by means of a linking structure applied to said roof, forming thereby said linking structure, the roof and the pillars an integral resistant structure for containing and regulating the deformation of the roof and its pillars upon a rollover event.

In a preferred embodiment of the present invention, the linking structure is a plate linking all original pillars of the vehicle In a preferred embodiment of the present invention, the plate is secured to the roof by means of bolts, rivets, adhesives or a combination thereof.

In a more preferred embodiment of the present invention, said plate is a laminate of composite material, linking all the pillars of the roof.

In a preferred embodiment of the present invention, the composite material comprises carbon fiber, Kevlar® or glass fiber and epoxy, phenolic or polyester resins In a more preferred embodiment of the present invention, the method further comprises applying at least one honeycomb spacer over said composite material laminate and another laminate over each spacer, thus forming a "sandwich" type plate with a high moment of inertia In a most preferred embodiment of the present invention, the linking structure is a truss structure comprising a plurality of beams of the truss type, placed atop the roof of the vehicle, the beams being arranged so that upon the deformation of one of the pillars of the vehicle the linking structure distributes the resulting load among the remaining pillars.

In a preferred embodiment of the present invention, said beams of the truss type are comprised of a plurality of cantilevers attached to a central body or structure.

In a preferred embodiment of the present invention, the method further comprises the addition of controllable and calibratable deformation elements to said linking structure.

In a preferred embodiment of the present invention, the beams of the linking structure have a curved and aerodynamic cross section.

DETAILED DESCRIPTION OF THE INVENTION

Figure 1:
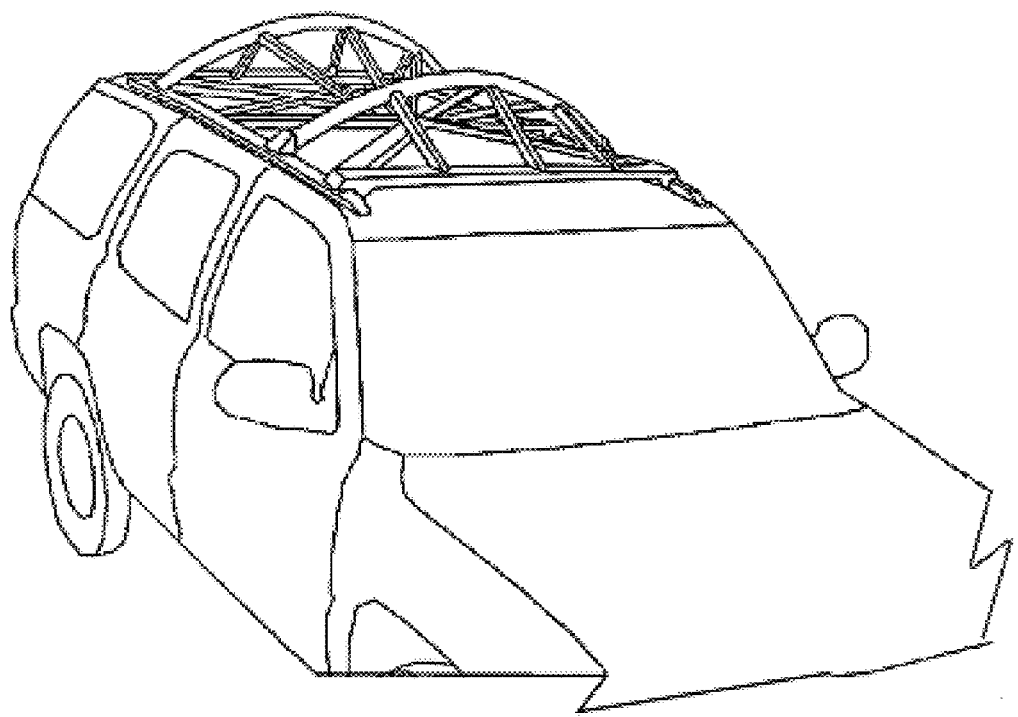
FIG. 1 shows a prior art rollover protection device, more specifically the HALO system.

In order to provide a proper description of the characteristics and advantages of the rollover protection device of the present invention, it is necessary to provide a brief description of the rollover mechanics of a vehicle.

Rollover mechanics during a rollover of the type known as "barrel roll" is described and illustrated in the technical report: "*Inner cages and external anti-rollover beams for pickups*" ("*Jaulas internas y barras externas antivuelco para camionetas pick-up*")—Center for Experimentation of Road Safety (Centro Experimental de Seguridad Vial—CESVI), Jun. 2011, hereby included as reference in its entirety.

In said report the barrel roll is described as being comprised of four stages:
1) At the start of the sidewise rollover, the corresponding vehicle side will not come into contact with the ground;
2) The vehicle will impact on the ground with the roof edge of said vehicle side;
3) The vehicle will roll and drag over its roof;
4) Finally, the vehicle will stand and drag on the opposite vehicle side.

In accordance with the kinetic energy of the vehicle, the same will perform a greater or lower number of complete rolls over the duration of the rollover.

However, due to the mechanics of a barrel roll, it is common that the vehicle, while rolling and upon making contact with the wheels on the ground, will make a jump, which will elevate it vertically. During this jump the vehicle continues turning and the jump ends, a fraction of a turn later, upon making contact with the ground again. This fall and impact occurs over the side of the roof opposite to the wheels that cause the elevation. It is in this impact when the roof must withstand both the falling stress as well as the rolling stress.

In case the vehicle does not have the strength to withstand the force of said impact, the roof will collapse by its A pillar, which is the most vulnerable. This vulnerability is further increased by the usual slant of said pillar due to the angle of the windshield, which in modern units is increasingly accentuated.

Upon collapse of the A pillar, the surface of the roof panel will pull with a horizontal component on all the remaining B and C pillars, which are not prepared to withstand this kind of stress. Said pull stress, combined with the vertical pressure of the fall results in the collapse of the cabin, whose roof is flattened. If the cabin is weak, the flattening will reach the waistline, with consequent injuries to the vehicle occupants and damage to the vehicle itself.

The device of the present invention, when applied on the roof of a vehicle, preferably of the pickup type, provides the roof with the capability of making all the pillars work together, so that the stresses applied to one or more of them during rollover are jointly withstood by the remaining pillars.

In a double cabin vehicle, without the protection of the device of the present invention, during a rollover event, the topmost end of the A pillar, at the site where said pillar is connected to the ceiling, receives the weight of the falling pickup upon making contact with the ground. Under these conditions, the A pillar folds towards the center the cabin and towards the rear thereof. The remaining pillars cannot contribute to resisting said stress, since the roof panel is usually only 0.7 mm thick and is easily folded. Additionally, as the A pillar yields and deforms, it begins to pull the roof panel, which, in turn, pulls the B pillar transversely, initiating its misalignment. If during the following roll said B pillar receives a vertical load, it will collapse.

In conclusion, the collapse of the cabin occurs because the pillars yield one by one without being able to combine the strength of all six pillars when one of them receives a compromising load.

Precisely, the rollover protection device of the present invention provides a linking structure for the roof of a vehicle, in particular for vehicles of the pickup and light truck types, that links all the pillars of the original vehicle roof, so that when one of the pillars is subjected to a load, the other pillars share the stress and provides the affected pillar with the capability to deform and withstand the load in an appropriate manner.

The device and method of the present invention can be carried out in various ways and with various materials.

In the figures of the present invention, the references to the pillars of the vehicle are designated with upper case letters "A", "B" and "C" in according to the usual terminology known in the art., while the corresponding supporting points of the structure are designated with lower case letters "a", "b" and "c". The remaining references in the figures are numerical.

Roof laminate

A first embodiment of the present invention consists of "laminating" the roof, increasing its thickness by adding one or more layers or sheets of reinforcement material and one or more layers of spacer material. Thus, the linking structure is formed by at least one plate that links all the pillars of the cabin.

Figure 2:
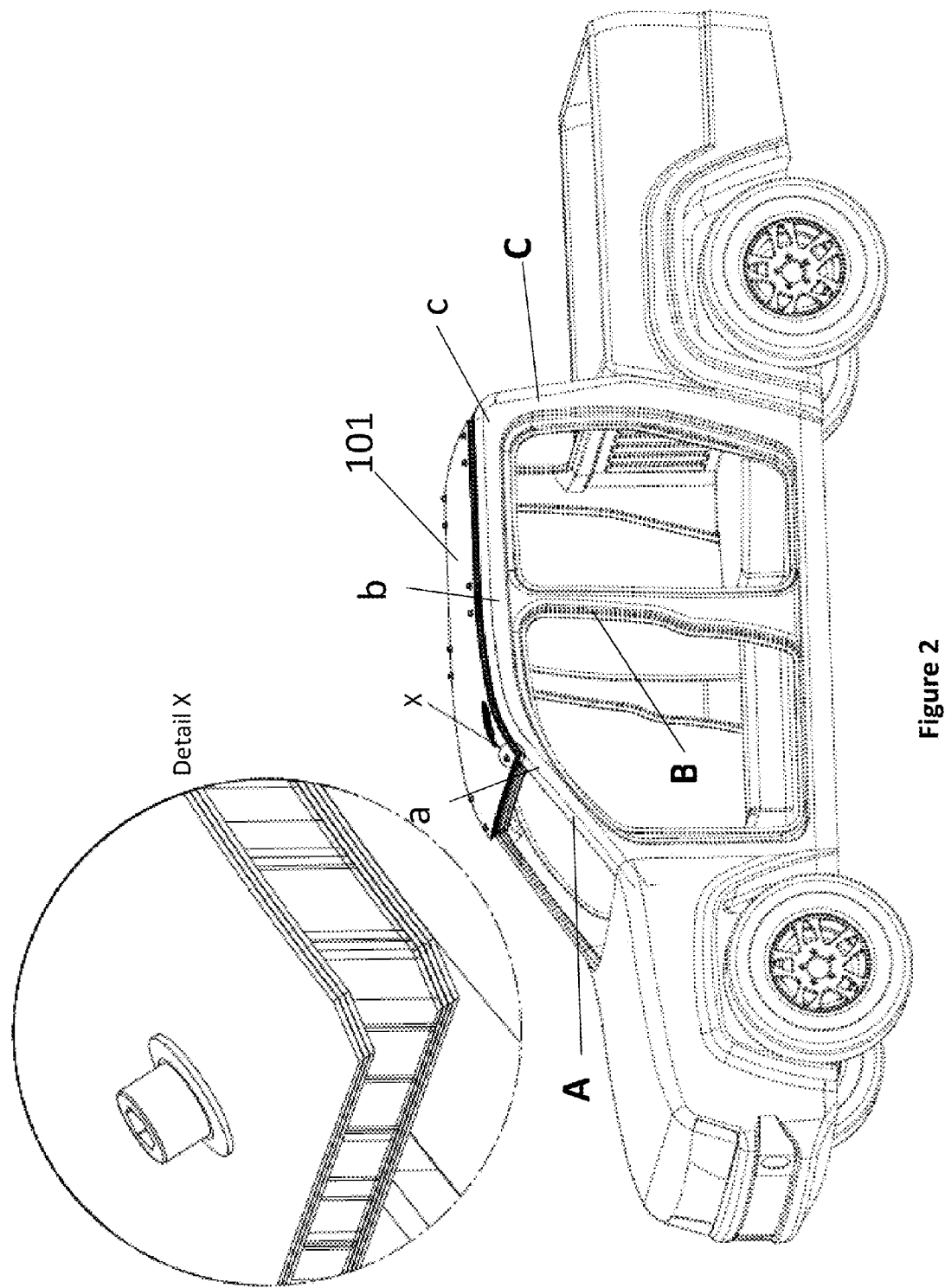
FIG. 2 shows a perspective view and detail of a first embodiment of the present invention, wherein the linking structure is a composite laminated plate.

FIG. 2 shows a first embodiment of the present invention, wherein the reinforcement device comprises a laminate of composite material 101, which preferably comprises carbon fiber, Kevlar® or glass fiber and epoxy, phenolic or polyester resins adhered to the roof, which thickens its thickness, preferably 15 to 30 times, in order to grant said roof with the strength and toughness required to achieve the joint action of the pillars. The composite laminate may comprise a plurality of layers or sheets, of a single material or a combination of materials, as shown in Detail X in FIG. 2. In a preferred embodiment of the present invention, the laminate is secured to the roof of the cabin at the topmost ends "a", "b", and "c" of the A, B and C pillars respectively by means of bolts or rivets. Additionally, the attachment may be reinforced by means of adhesives.

Figure 3:
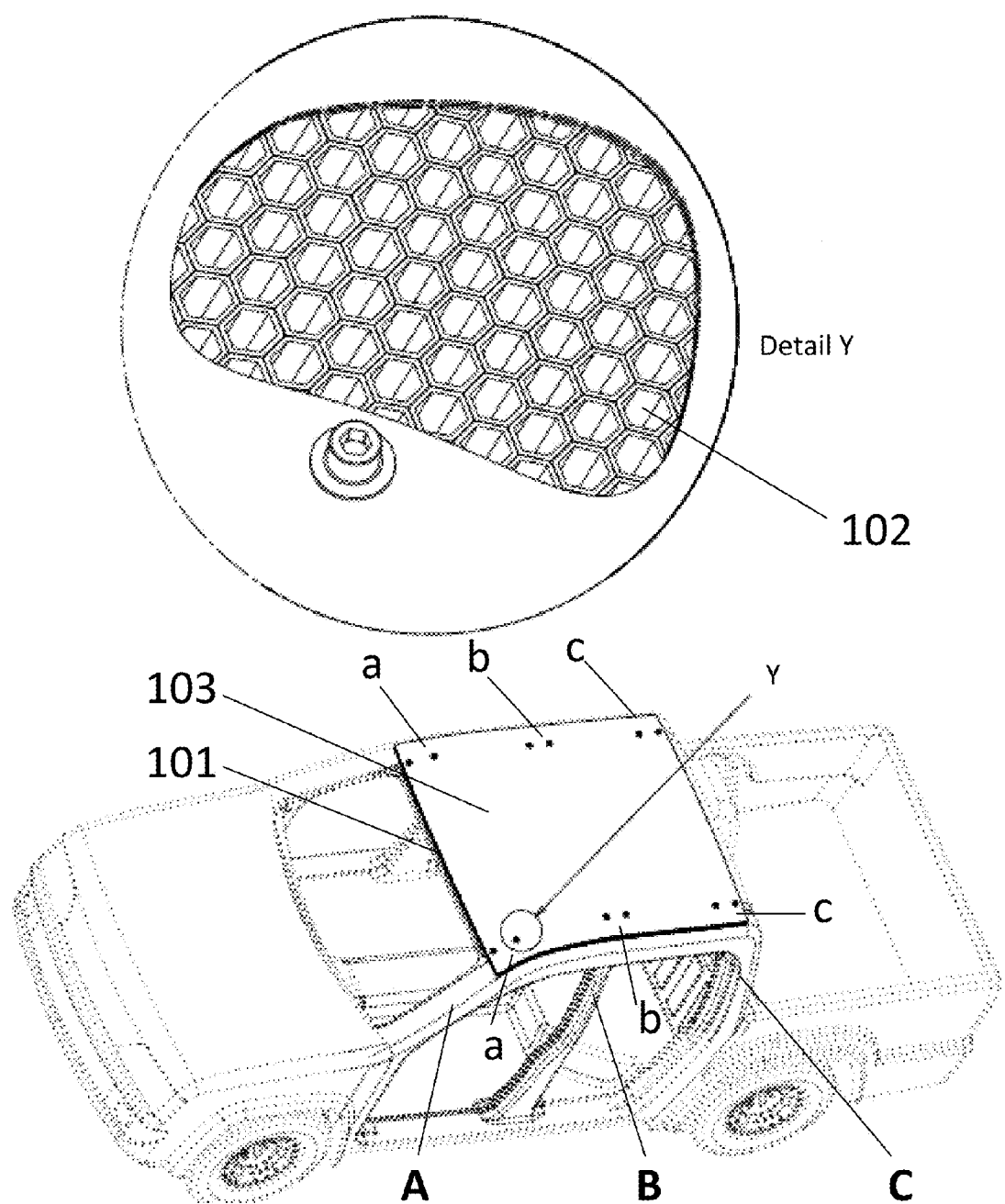
FIG. 3 shows a perspective view and detail of a preferred version of the first embodiment of the present invention, wherein the laminate comprises a honeycomb spacer.

FIG. 3 shows a preferred form of this embodiment of the present invention, wherein the protection device comprises a laminate of composite material 101 on the surface of the roof of the cabin, a honeycomb spacer 102 over said laminate 101, and another laminate 103 applied over said spacer 102, therefore transforming the roof of the cabin into a "sandwich" type plate with a high moment of inertia capable of associating the pillars for them to work together against deformation stresses, in accordance with the object of the present invention. Detail Y of FIG. 3 shows a cross section view of the upper laminate 103, wherein the honeycomb spacer 102 can be seen over the lower laminate 101 and under the upper laminate 103, whose hexagonal cells are arranged in a direction perpendicular to the surface of the roof. In a preferred embodiment of the present invention, the laminate with spacer is secured to the roof of the cabin at the topmost ends "a", "b", and "c" of the A, B and C pillars respectively by means of bolts or rivets. Additionally, the attachment may be reinforced by means of adhesives.

Due to its low profile and design that preserves the curvature of the original roof of the cabin, this embodiment results in lower noise generation and lower negative aerodynamic effects than the structures known in the prior art cited above.

Truss Structure

Other embodiments of the present invention comprise the use of linking structures of the truss type. Said structures comprise a plurality of beams, located above the roof and fixed in such a way that upon deformation of one of the pillars of the vehicle the structure distributes the resulting load among the remaining pillars.

FIGS. 4 to 9 show a structure according to this embodiment of the present invention, which comprises a beam structure fixed to the roof of the cabin, wherein "a", "b", and "c" are the topmost ends of the A, B and C pillars respectively. In a preferred embodiment of the present invention, the truss structure comprises three rigid trusses; a transversal center truss B-B and two diagonal trusses A-C. Each truss comprises a bottom beam or chord 201 and a top beam or chord 202. The central truss B-B links together the topmost ends "b" of the B pillars on both sides of the cabin, while the diagonal trusses A-C link together the topmost ends "a" of the A pillars on one side of the cabin to the topmost end "c" of the C pillar on the opposite side of the cabin. The trusses B-B and both trusses A-C are laid and fixed over "a", "b" and "c" ends of the A, B and C pillars respectively by means of bolted supports 204.

The structure may comprise one or more struts 203, which can be either vertical or slanted. In a preferred embodiment of the present invention, two vertical struts 203 are used, located at the intersection points between the central truss B-B and both diagonal trusses A-C.

In this structural configuration, the central truss B-B withstands a significant load which must be compatible with the resistance to buckling of both B pillars, which are linked to said truss, preferably by means of bolts. This ability of the central truss B-B to withstand loads in its center zone is of critical importance since it is in this zone where the central truss B-B meets both diagonal trusses A-C. Said diagonal trusses A-C cross the roof diagonally, linking the A pillars to the C pillars and crossing the transversal central truss B-B by its center zone, where they share the struts 203.

In an embodiment of the present invention, the structure may comprise side rails 205 on the sides and crossbeams 206 over the windshield and/or the rear end of the structure. These components may or may not be integrated into the structure, in accordance with the original toughness characteristics of the vehicle cabin where the protection device of the present invention is to be installed.

Figure 4:
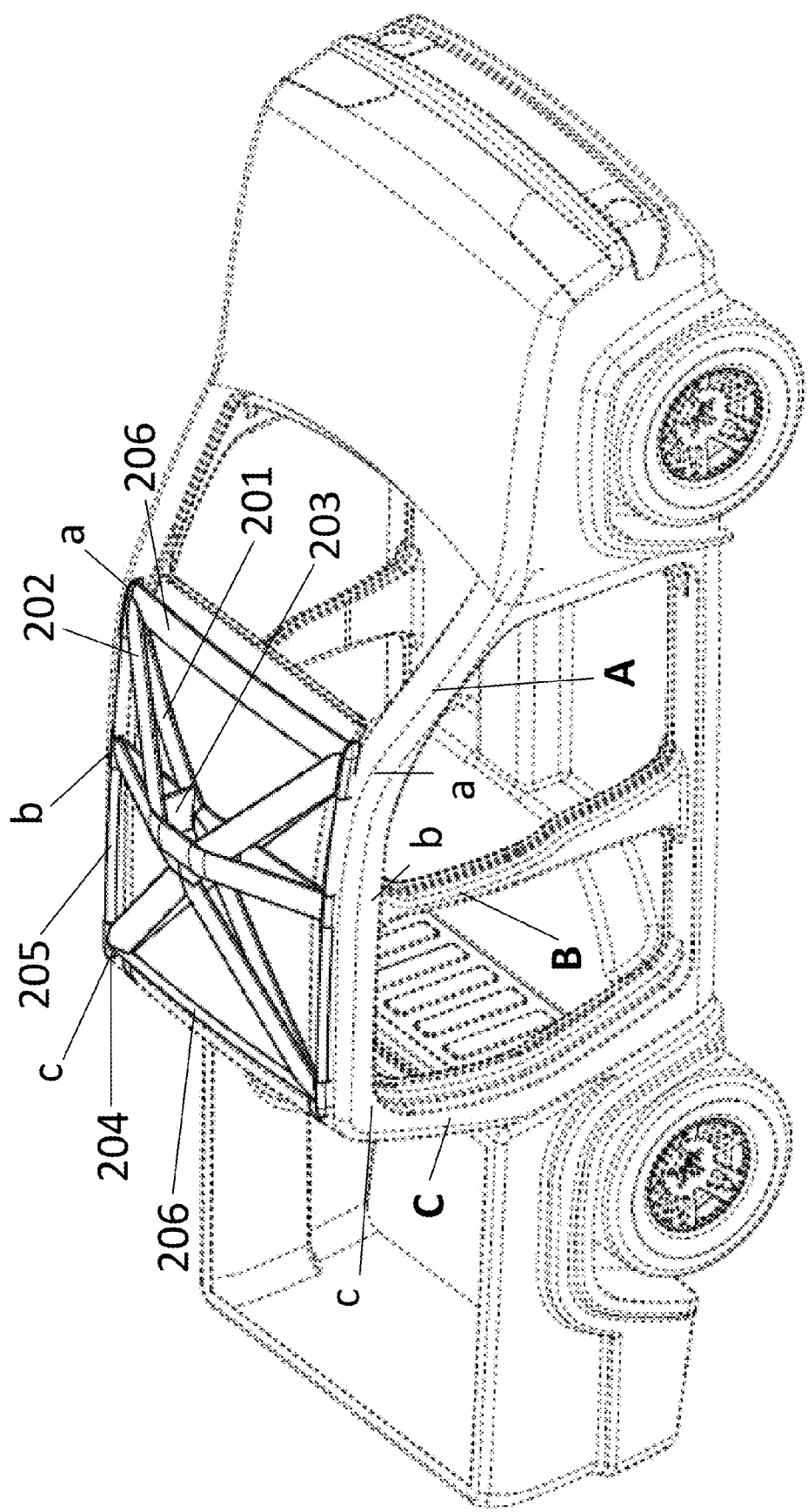
FIG. 4 shows a perspective view and detail of a second embodiment of the present invention, wherein the linking structure is a truss structure.
Figure 5:
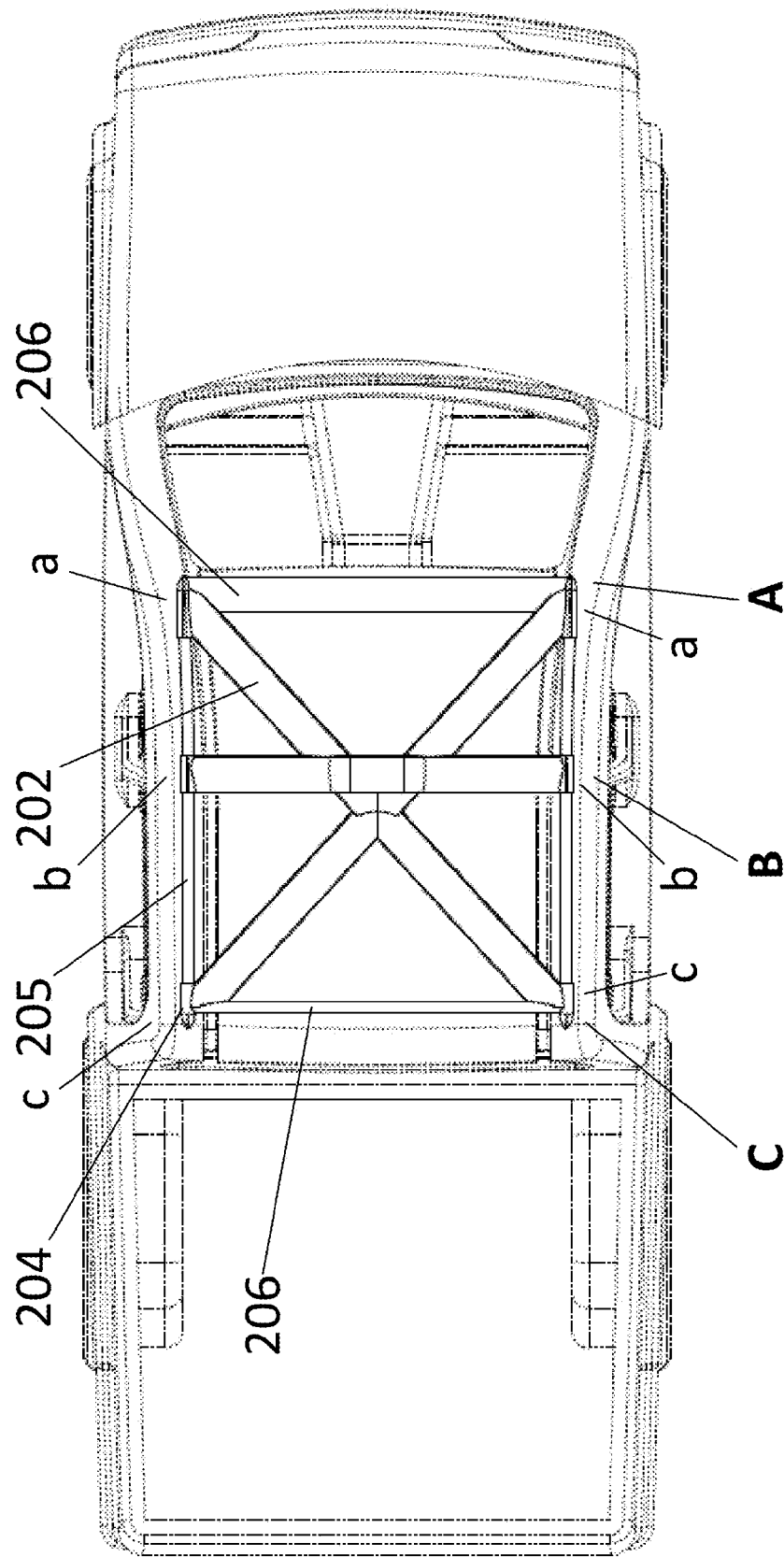
FIG. 5 shows a top view of the embodiment shown in FIG. 4.
Figure 6:
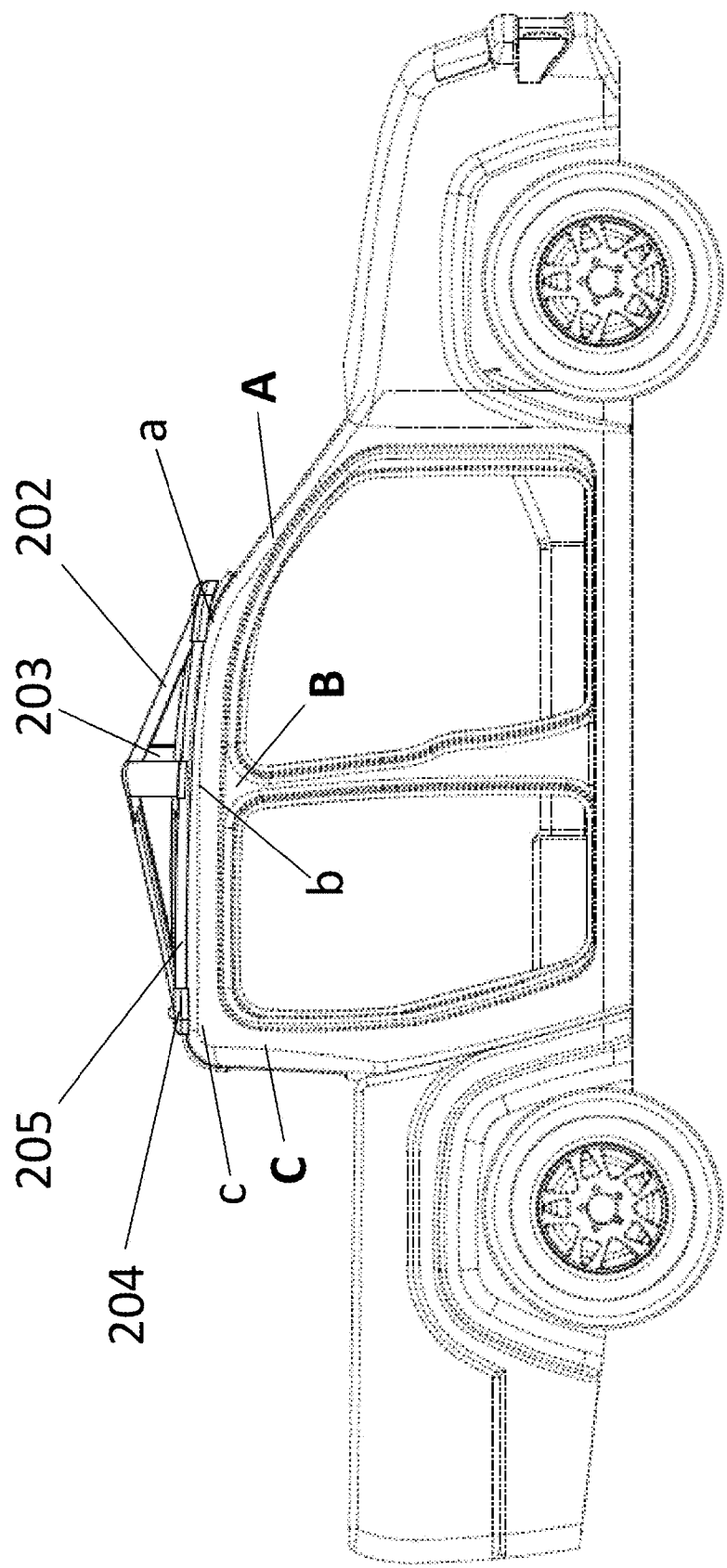
FIG. 6 shows a side view of the embodiment shown in FIG. 4.
Figure 7:
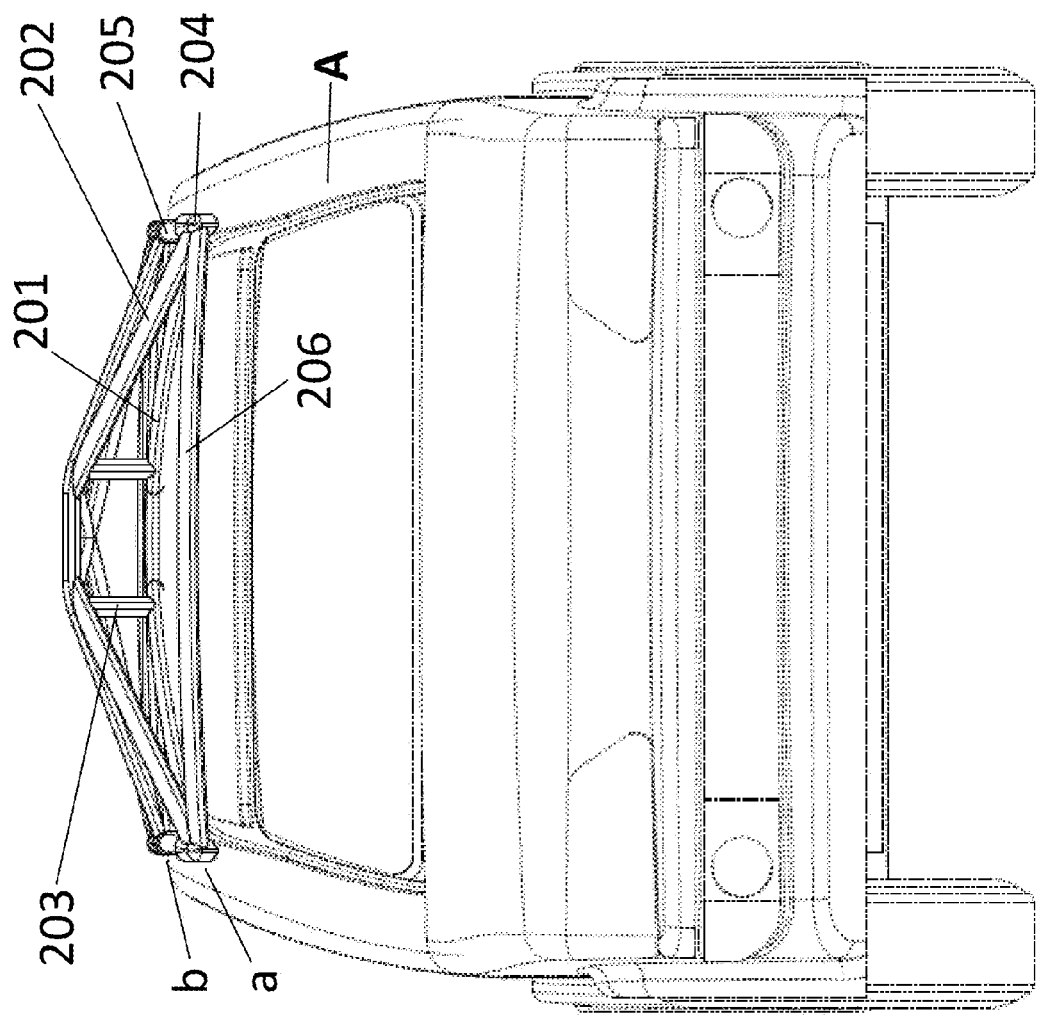
FIG. 7 shows a front view of the embodiment shown in FIG. 4.
Figure 8:
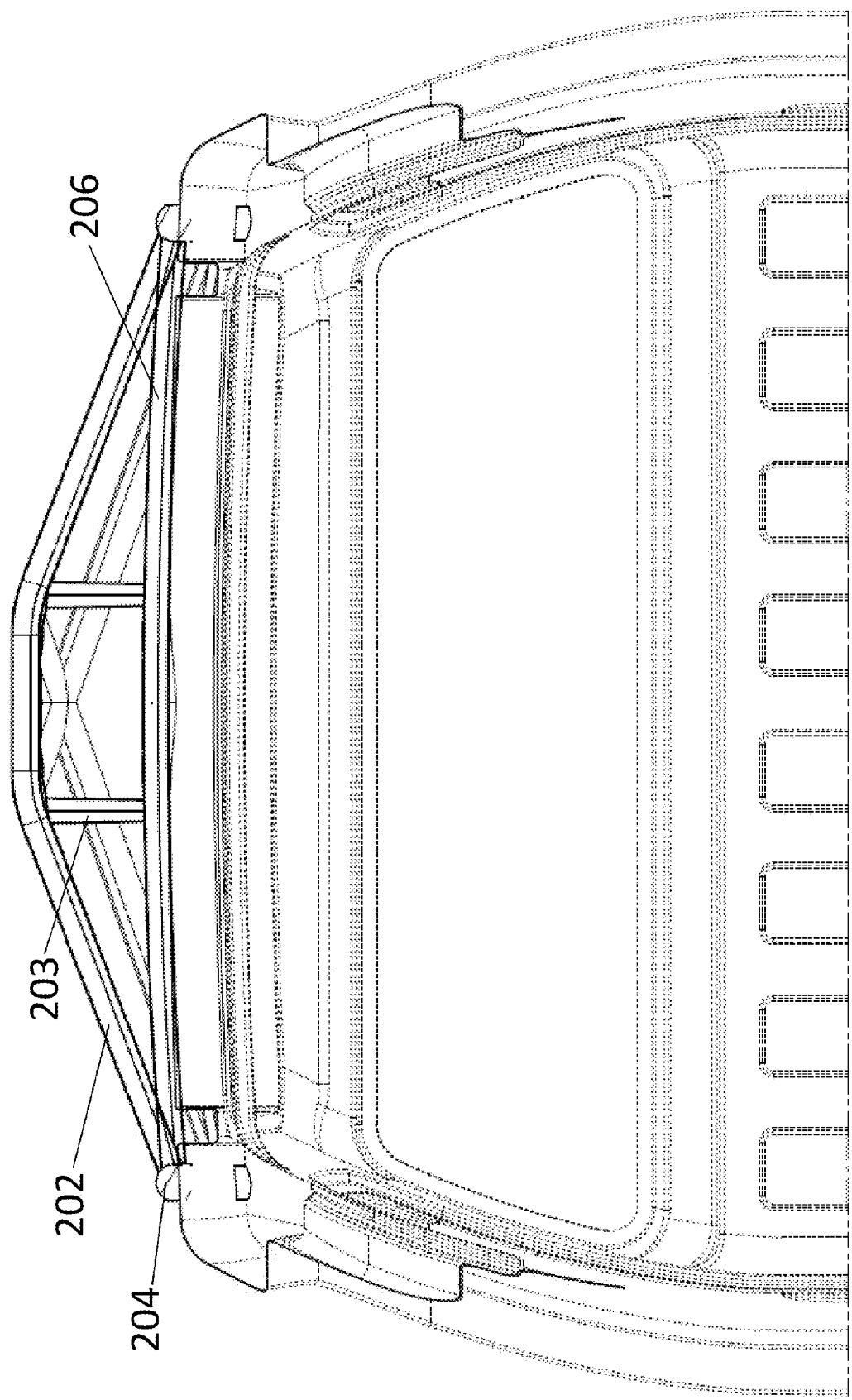
FIG. 8 shows a front section view of the embodiment shown in FIG. 4.
Figure 9:
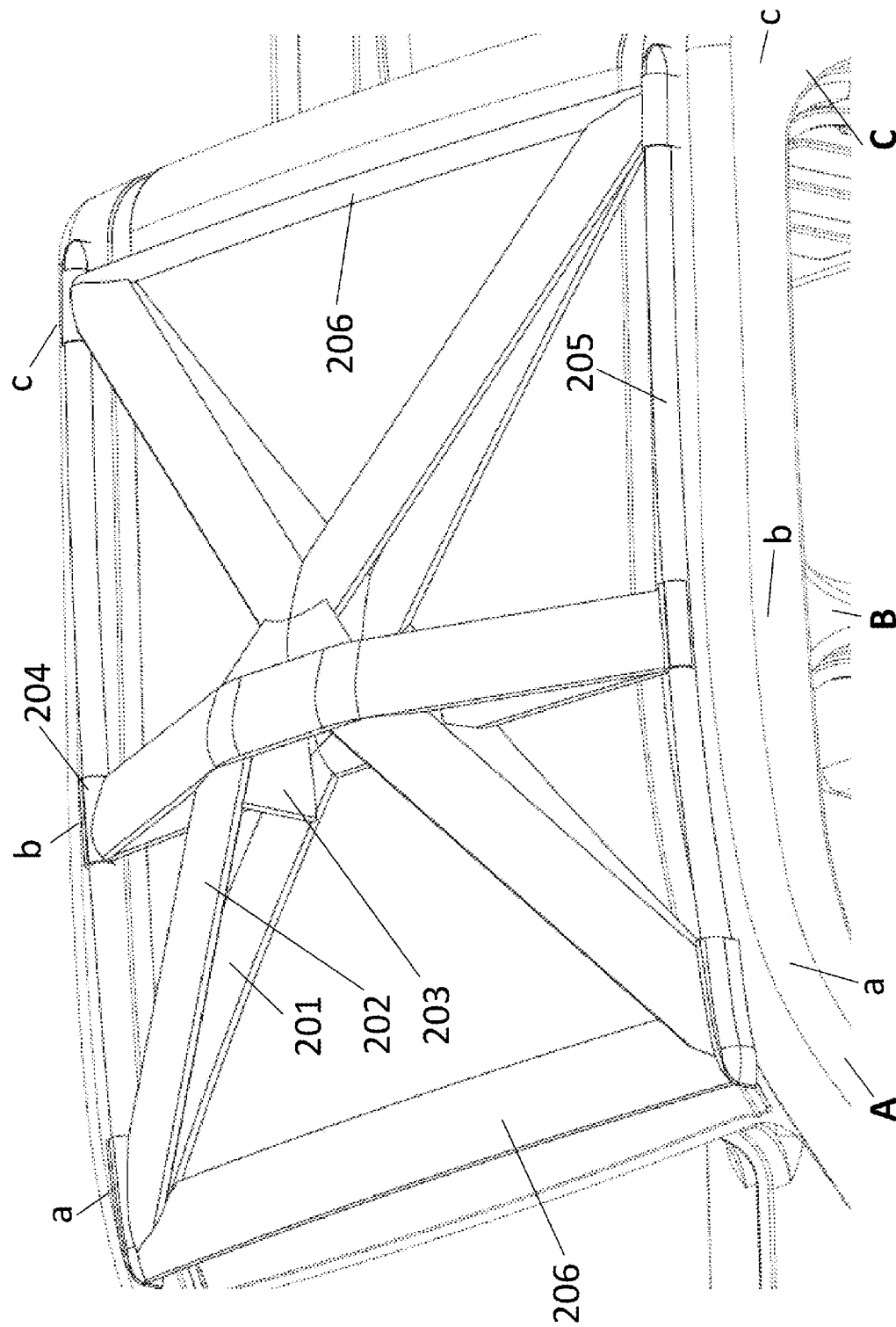
FIG. 9 shows another perspective view of the embodiment shown in FIG. 4.
Figure 10:
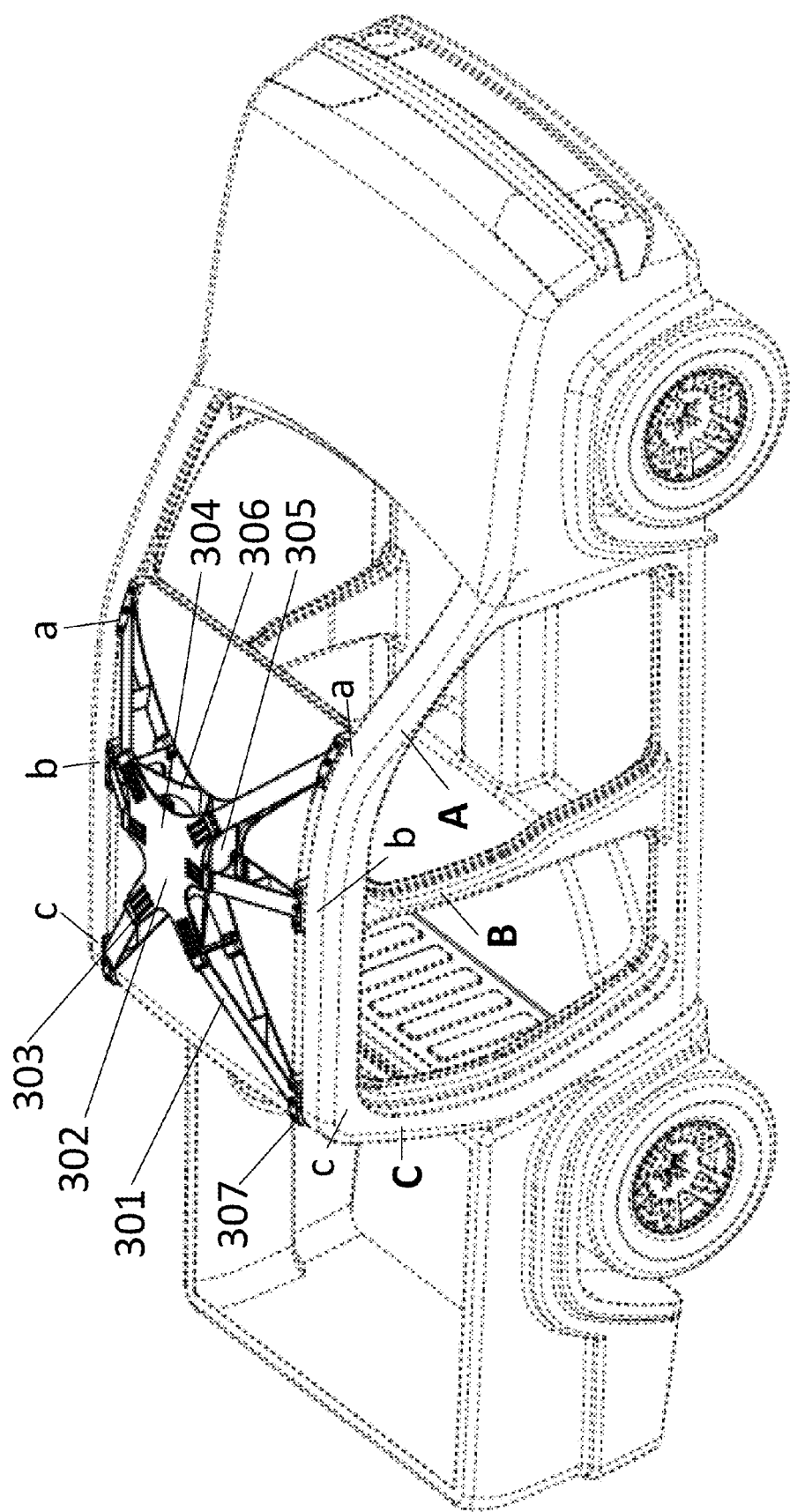
FIG. 10 shows a perspective view of a third embodiment of the present invention, wherein the linking structure is a controlled deformation structure.
Figure 11:
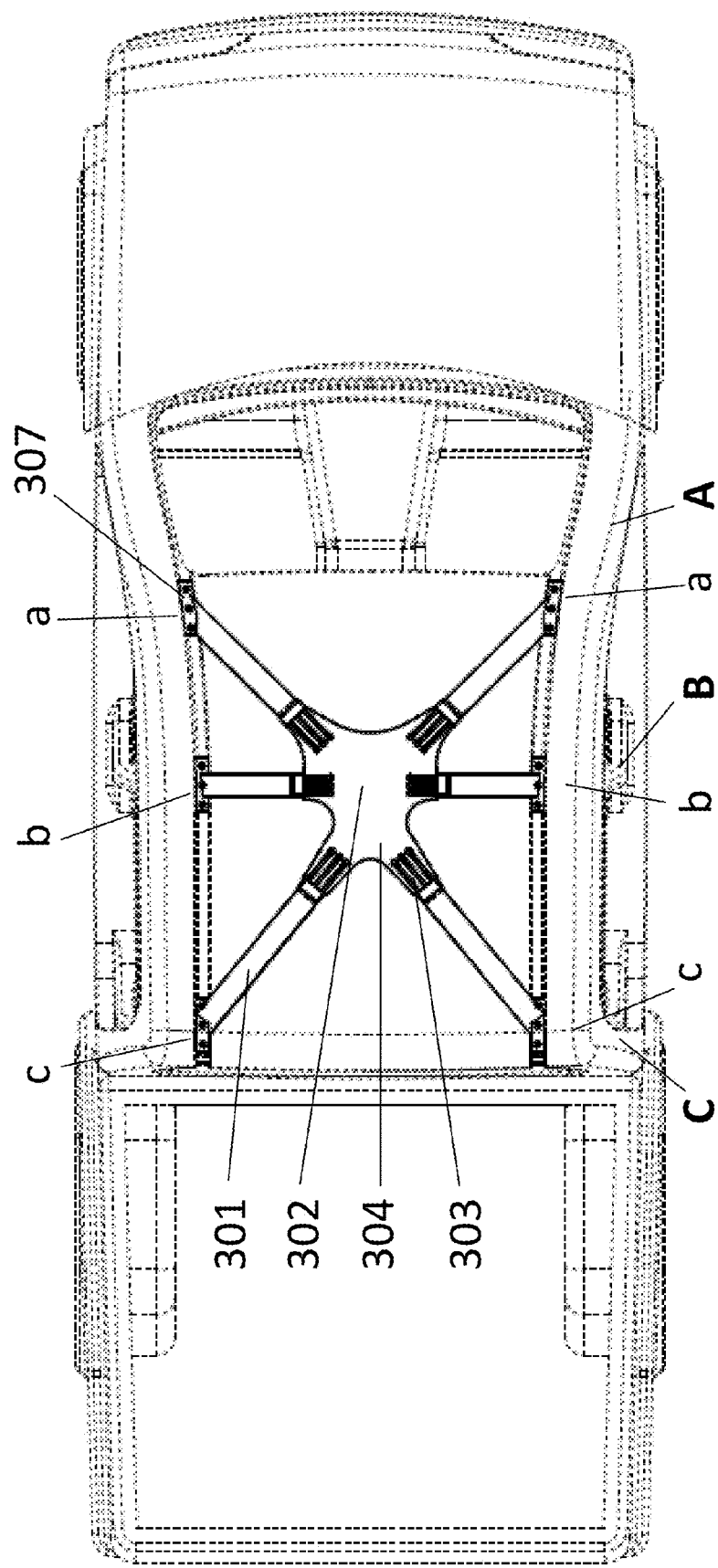
FIG. 11 shows a top view of the embodiment shown in FIG. 10.
Figure 12:
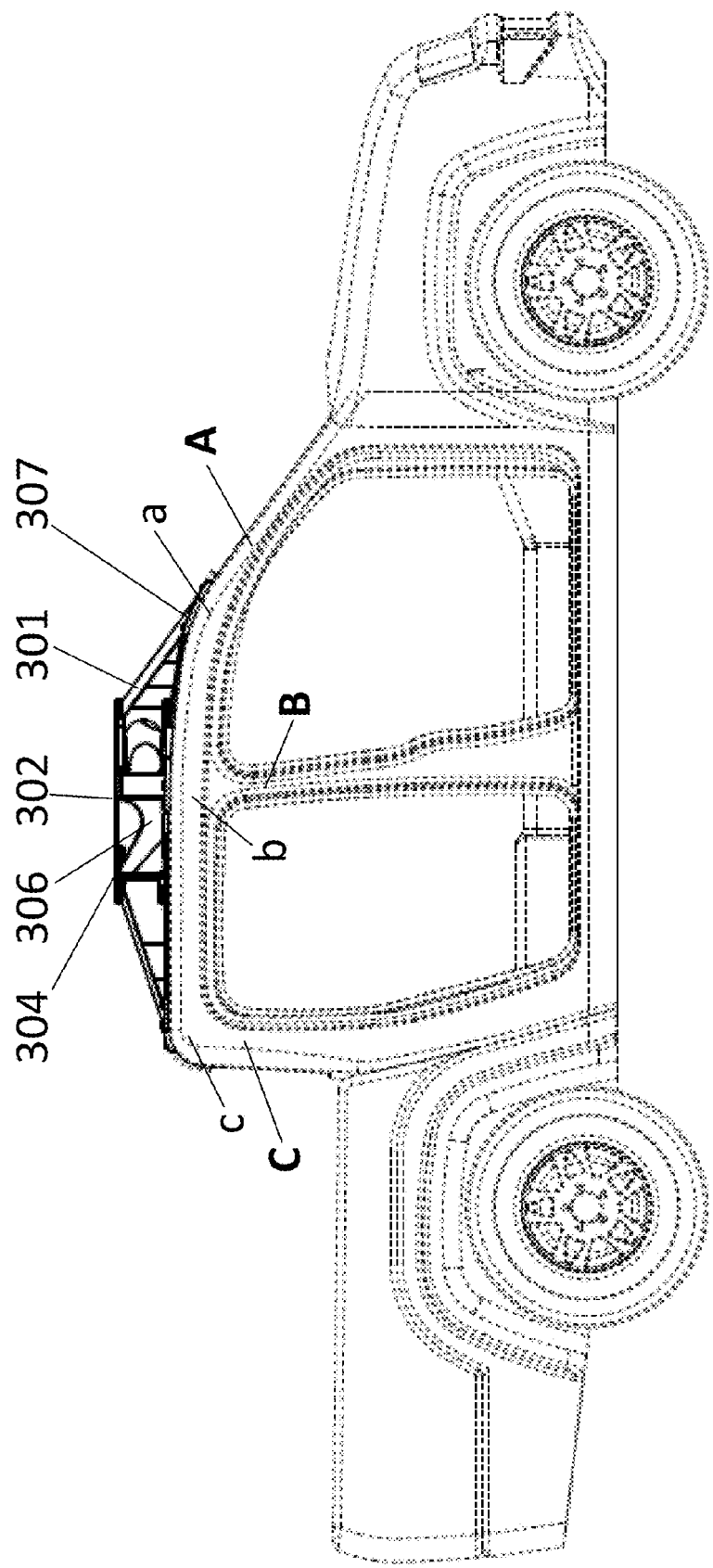
FIG. 12 shows a side view of the embodiment shown in FIG. 10.
Figure 13:
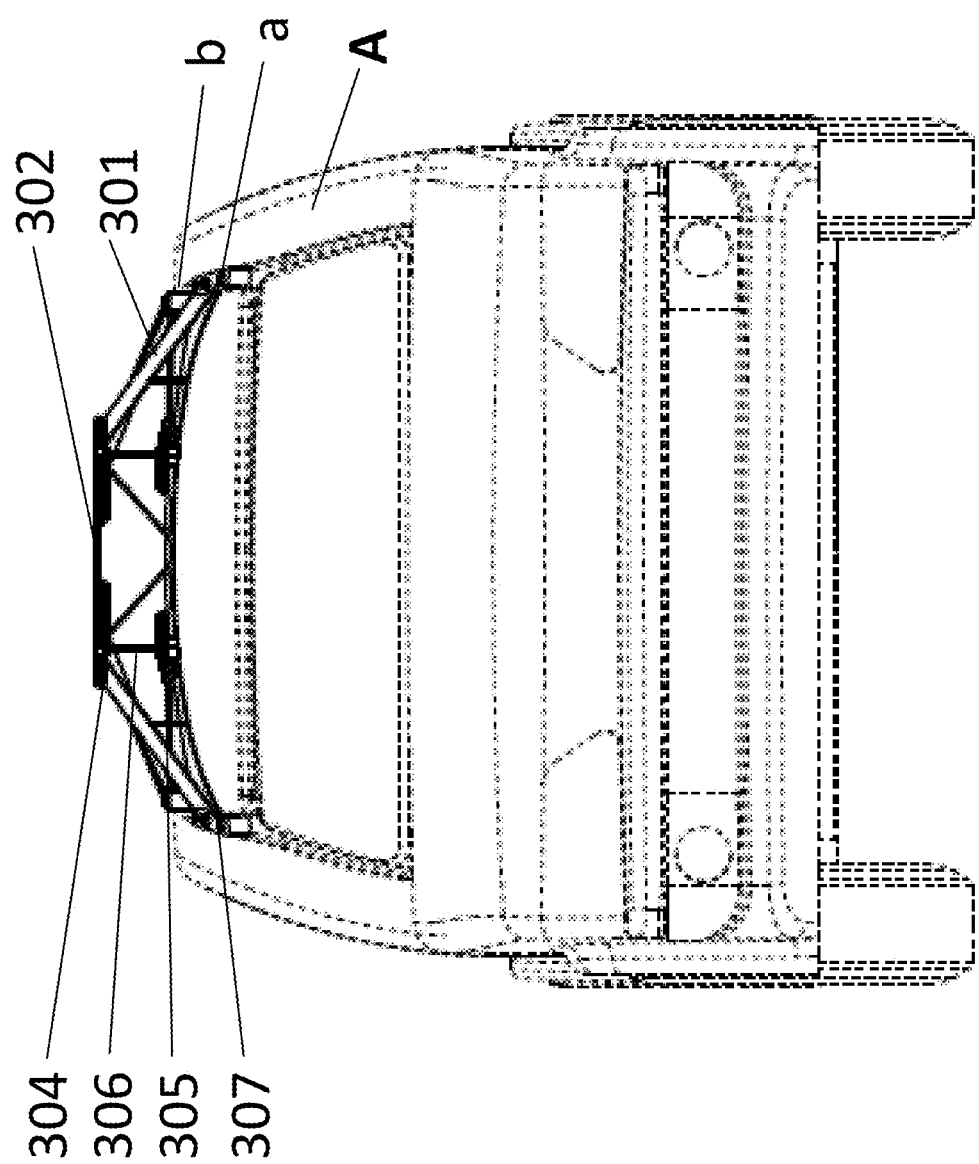
FIG. 13 shows a front view of the embodiment shown in FIG. 10.
Figure 14:
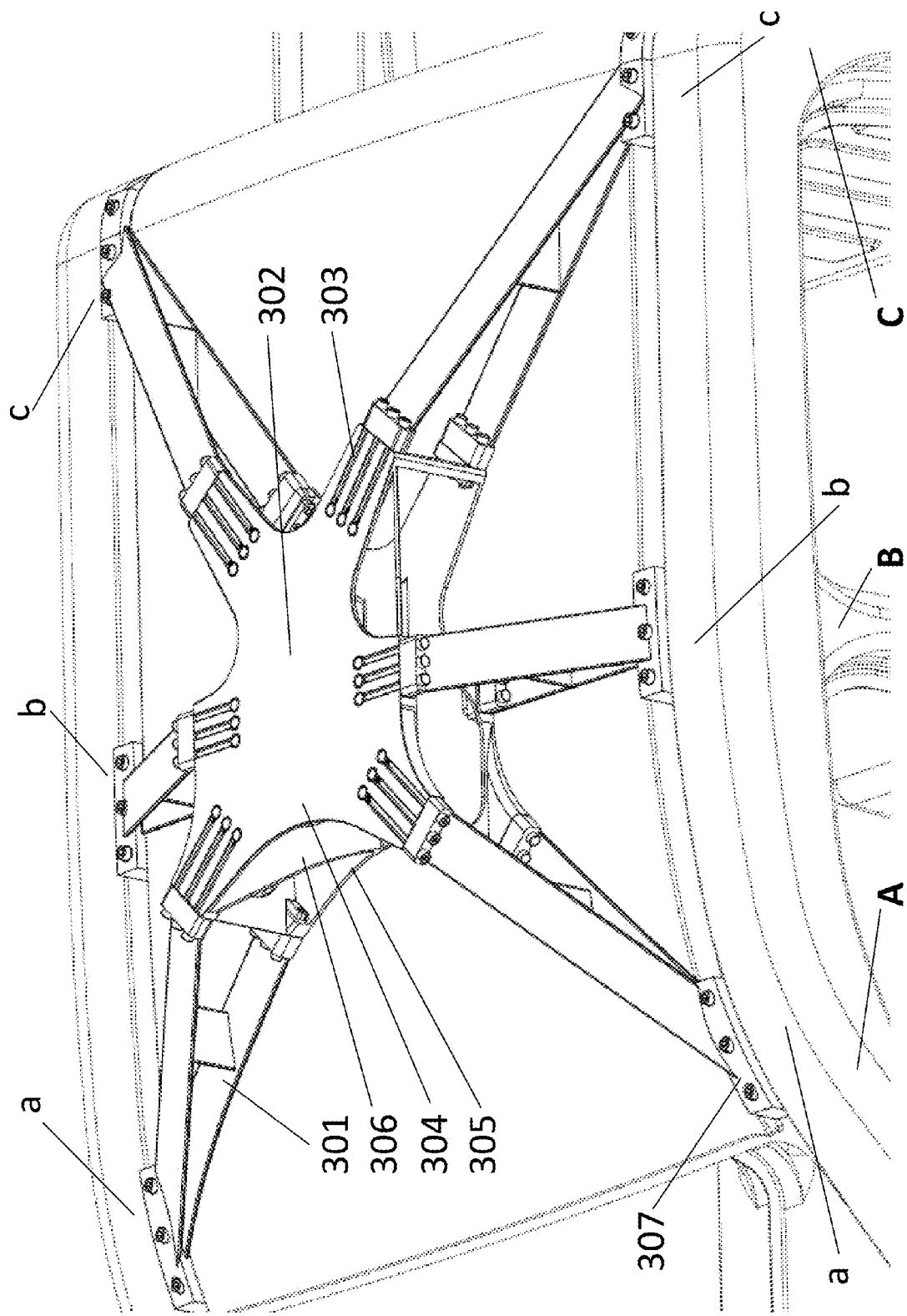
FIG. 14 shows another perspective view of the embodiment shown in FIG. 10.
Figure 15:
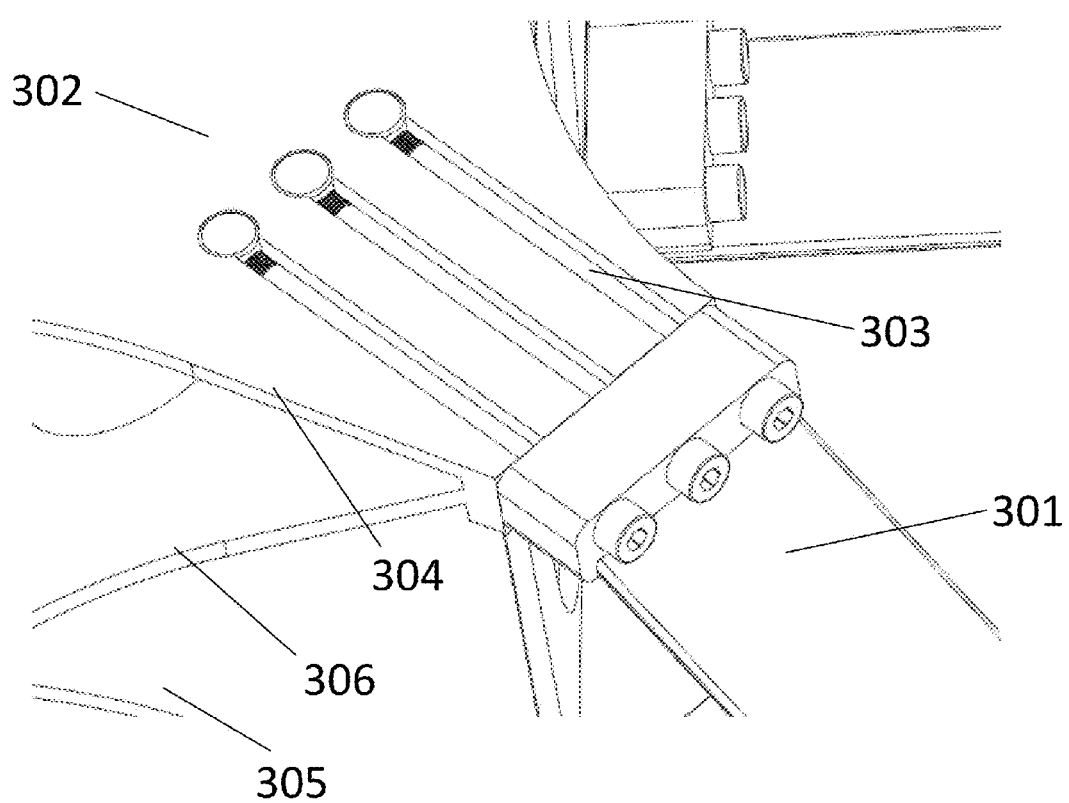
FIG. 15 shows a perspective detail view of the embodiment shown in FIG. 10.

By way of example of the device of the present invention in operation, the embodiment of FIG. 4 applied to a vehicle is subjected to the consequences of a typical rollover scenario, more specifically, the crushing of the A pillar at the junction point between the same and the roof of the vehicle. For this example, a 10 cm subsidence of the right A pillar is produced. With the vehicle being equipped with the protective structure of the present invention, the right support point "a" of the protection structure will descend 10 cm following the right A pillar.

With the diagonal truss A-C being rigid and the central truss B-B being located in the central region of the roof, in order for said support point "a" to descend the previously mentioned 10 cm, the B pillars must deform, subside or descend approximately 5 cm. In particular, the right B pillar will suffer a deformation greater than that of the left B pillar due to its proximity to the application point of the deformation force.

These approximately 5 cm are reduced as the C pillar stretches. In this way, the deformation of the right support point "a" loads on both support points "b" and pulls on the left C pillar.

This set of loads has been analyzed by finite element simulations, obtaining the stresses and deformations produced by a given load, and demonstrating that the joint deformation of the roof and pillars is achieved, preventing the collapse of the roof.

It should be noted that protection must be capable of deformation, up to the standard limits. (Joint deformation).

This embodiment of the present invention further features a structural design that favors the free passage of air through the same when the vehicle is moving. The profiles or sections of the beams and struts, which make up the truss structure, are curved profiles or airfoils, and are oriented in order to obtain a greater noise reduction and a better aerodynamic behavior compared to the previously mentioned structures known in the art.

Structure with controlled and calibratable deformation.

A structure that is too rigid, meaning a structure which does not deform properly, produces, in the event of a rollover, an increase in the decelerations that the occupants must endure. For this reason, a more preferred embodiment of the present invention provides a roof protection structure that prioritizes achieving joint deformation. This more preferred embodiment comprises elements with controlled and calibratable deformation, or more specifically, one or more parts of the structure are joined or attached together by means of elements with controlled and calibratable deformation, as shown in FIGS. 10 to 15.

This more preferred embodiment of the present invention comprises a transversal truss B-B and two diagonal trusses A-C. Unlike the previous embodiments, instead of sharing two struts 203, the truss structure is comprised of 6 cantilevers 301 attached to a central body or structure 302 hereby referred to as "central body".

Each cantilever 301 comprises, on one of its ends, a support piece 307, which rests upon the roof of the cabin and is linked to the same by means of proper fastening means, preferably bolts with watertight seal. The support pieces 307 comprise plywood in order to secure the link.

On the other end, the cantilevers are attached to the central body by means of controlled deformation, i.e. stretching, bolts 303, accordingly lengthened.

Said fastening and deforming bolts 303 are guided along their full length through slots or canals in the central body 302 in order to, upon separation of the surfaces they hold together, guide said separation producing a proper stretching of the bolts and consequently the absorption of the impact energy.

This stretching of the bolts 303 must be adjustable, i.e. calibratable, in order to achieve the "joint deformation" of the roof and its pillars. Said calibration or adjustment of the controlled deformation is achieved by a proper selection of the bolts or studs, with the possibility of varying their number, as well as their length and cross section in relation to the weight of the original vehicle. Since the bolts or studs to be employed are elements readily available on the market and their behavior during stretching is information readily available or can be easily obtained through tensile tests, this embodiment of the present invention is advantageous considering its ease of employment and setting.

The central body 302 may be of various materials and obtained by various different methods. In a preferred embodiment of the present invention, the central body 302 is a single cast aluminum alloy piece, which comprises an upper plate 304 and a lower plate 305, reinforced with vertical partitions in a lattice and vertical walls 306. The lower plate 305 approximately follows the curvature of the roof surface of the vehicle model while the upper plate 304 is substantially planar. Said upper plate 304 further comprises orifices or canals in which the controlled deformation bolts 303 are housed.

This embodiment of the present invention further features a structural design which favors the free passage of air through it when the vehicle is in motion. The plates and profiles that make up the structure of said embodiment are mostly oriented so as to provide minimal frontal surface. Additionally, the invention foresees the use of airfoils or curved profiles in order to achieve a greater noise reduction and better aerodynamic behavior compared to the previously mentioned structures known in the art Due to its structural features, the embodiments of the present invention foresee the possibility of being used as, or in combination with, roof racks or other luggage carrying equipment, without negatively affecting its functionality as a safety device.

Additionally, the embodiments of the present invention foresee the application of smooth surface coatings or aerodynamic covers in order to obtain a greater reduction in noise generation and better aerodynamic performance of the same, without negatively affecting its functionality as a safety device.

The invention claimed is:

1. A rollover protection device for vehicles, and more specifically for work vehicles of the pickup and light truck type, wherein the device comprises a linking structure, applied to the roof of the cabin of the vehicle, that links all pillars of the original vehicle roof, forming thereby said linking structure, the roof and the pillars an integral resistant structure for containing and regulating the deformation of the roof and the pillars upon a rollover event.

2. The device according to claim 1, wherein for vehicles of double cabin pickup type, the linking structure is connected to all six pillars supporting the roof by their topmost end in order to jointly contain and regulate the deformation during a rollover event.

3. The device according to claim 1, wherein, for vehicles of the single cabin pickup types, the linking structure is connected to all four pillars supporting the roof by their topmost end in order to jointly contain and regulate the deformation during a rollover event.

4. The device according to claim 1, wherein said linking structure comprises a plate applied to the roof and connected to all pillars thereof.

5. The device according to claim 4, wherein the plate is secured to the roof by means of bolts, rivets, adhesives or a combination thereof.

6. The device according to claim 4, wherein said plate comprises a laminate of composite material applied to the roof.

7. The device according to claim 6, wherein the composite material comprises carbon fiber, para-aramid synthetic fiber or glass fiber and epoxy, phenolic or polyester resins.

8. The device according to claim 6, wherein said composite material laminate further comprises at least one honeycomb spacer and another laminate over each spacer, thus forming a "sandwich" type plate with a high moment of inertia.

9. The device according to claim 1, wherein said linking structure comprises a truss structure, comprising a plurality of beams of the truss type, the beams being arranged so that upon the deformation of one of the pillars of the vehicle the linking structure distributes the resulting load among the remaining pillars.

10. The device according to claim 9, wherein said beams of the truss type are comprised of a plurality of cantilevers attached to a central body or structure.

11. The device according to claim 1, wherein said linking structure further comprises controllable and calibratable deformation elements.

12. A method for reinforcing and protecting a vehicle against rollover, particularly for work vehicles of the pickup and light truck types, by containing the deformation of the roof and all pillars of the roof of the cabin, wherein the method comprises linking all pillars by means of a linking structure applied to said roof, forming thereby said linking structure, the roof and the pillars an integral resistant structure for containing and regulating the deformation of the roof and the pillars upon a rollover event.

13. The method according to claim 12, wherein the linking structure is a plate linking all original pillars of the vehicle.

14. The method according to claim 13, wherein the plate is secured to the roof by means of bolts, rivets, adhesives or a combination thereof.

15. The method according to claim 13, wherein said plate is a laminate of composite material, linking all the pillars of the roof.

16. The method according to claim 15, wherein the composite material comprises carbon fiber, para-aramid synthetic fiber or glass fiber and epoxy, phenolic or polyester resins.

17. The method according to claim 15, wherein the method further comprises applying at least one honeycomb spacer over said composite material laminate and another laminate over each spacer, thus forming a "sandwich" type plate with a high moment of inertia.

18. The method according to claim 12, wherein the linking structure is a truss structure comprising a plurality of beams of the truss type, placed atop the roof of the vehicle, the beams being arranged so that upon the deformation of one of the pillars of the vehicle the linking structure distributes the resulting load among the remaining pillars.

19. The method according to claim 18, wherein said beams of the truss type are comprised of a plurality of cantilevers attached to a central body or structure.

20. The method according to claim 12, wherein the method further comprises the addition of controllable and calibratable deformation elements to said linking structure.

21. The device according to claim 9, wherein the beams of the linking structure have a curved and aerodynamic cross section.

22. The method according to claim 18, wherein the beams of the linking structure have a curved and aerodynamic cross section.

* * * * *